M. E. JONES, Jr. & J. L. JONES.
VEHICLE LIFTING MECHANISM.
APPLICATION FILED JULY 23, 1910.
1,236,571.
Patented Aug. 14, 1917.
5 SHEETS—SHEET 5.
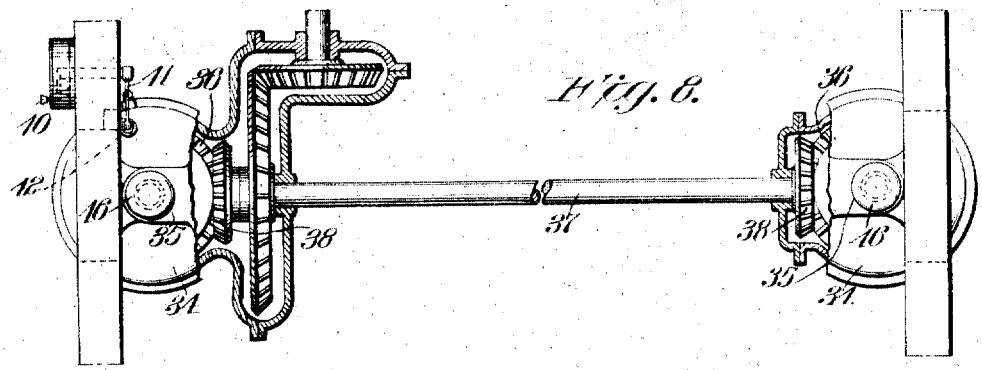
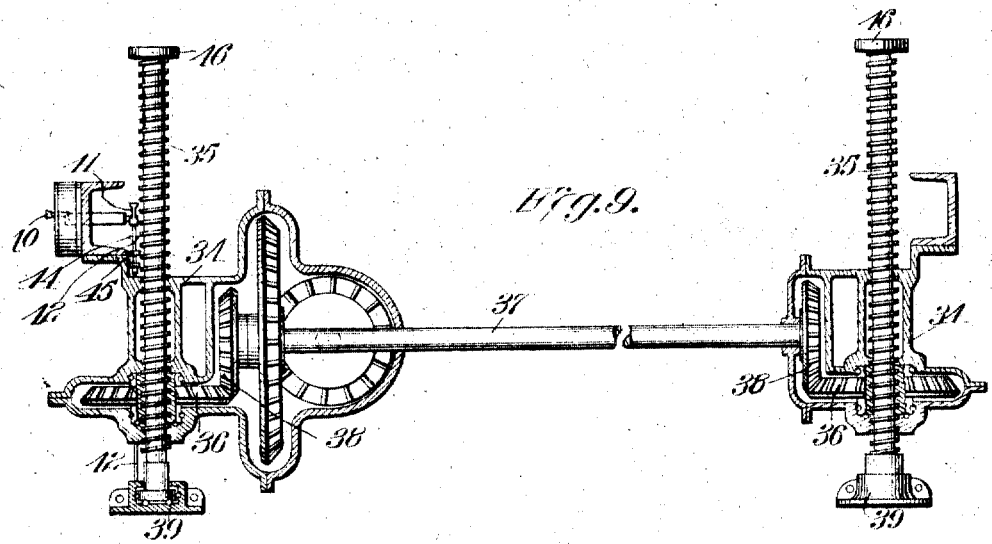
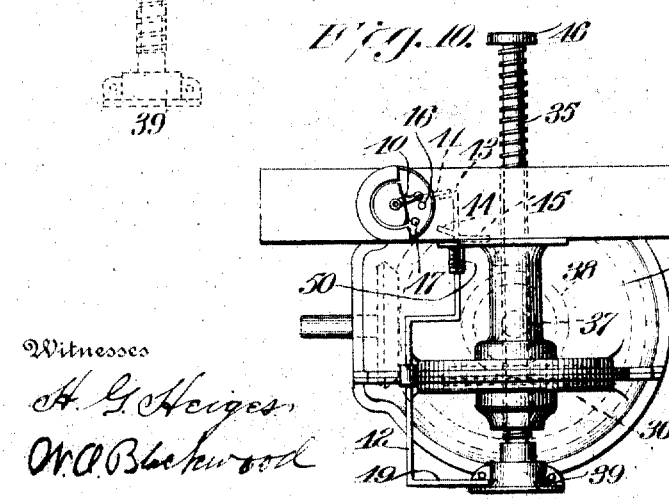
Witnesses
Inventors
Melville E. Jones, Jr. and
James L. Jones,
Attorney.

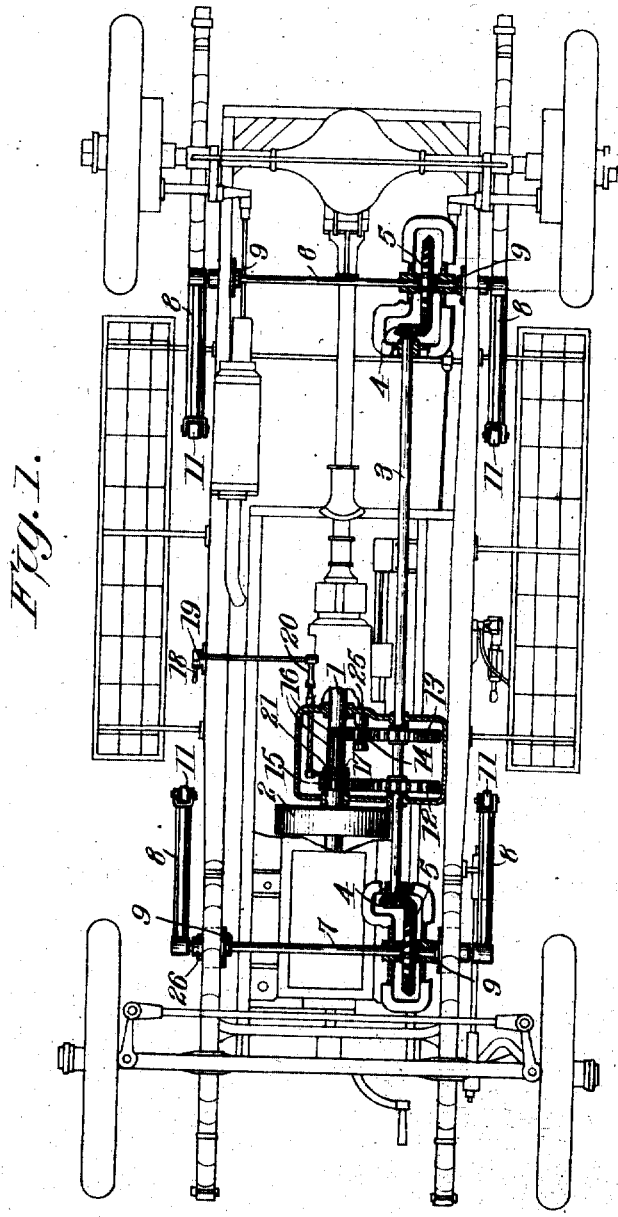

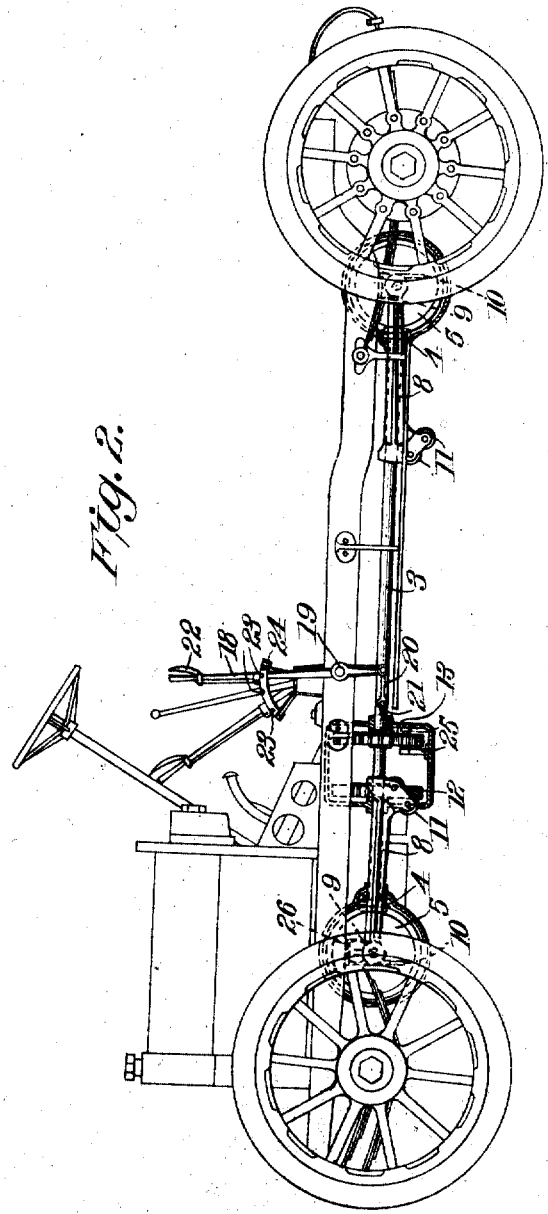

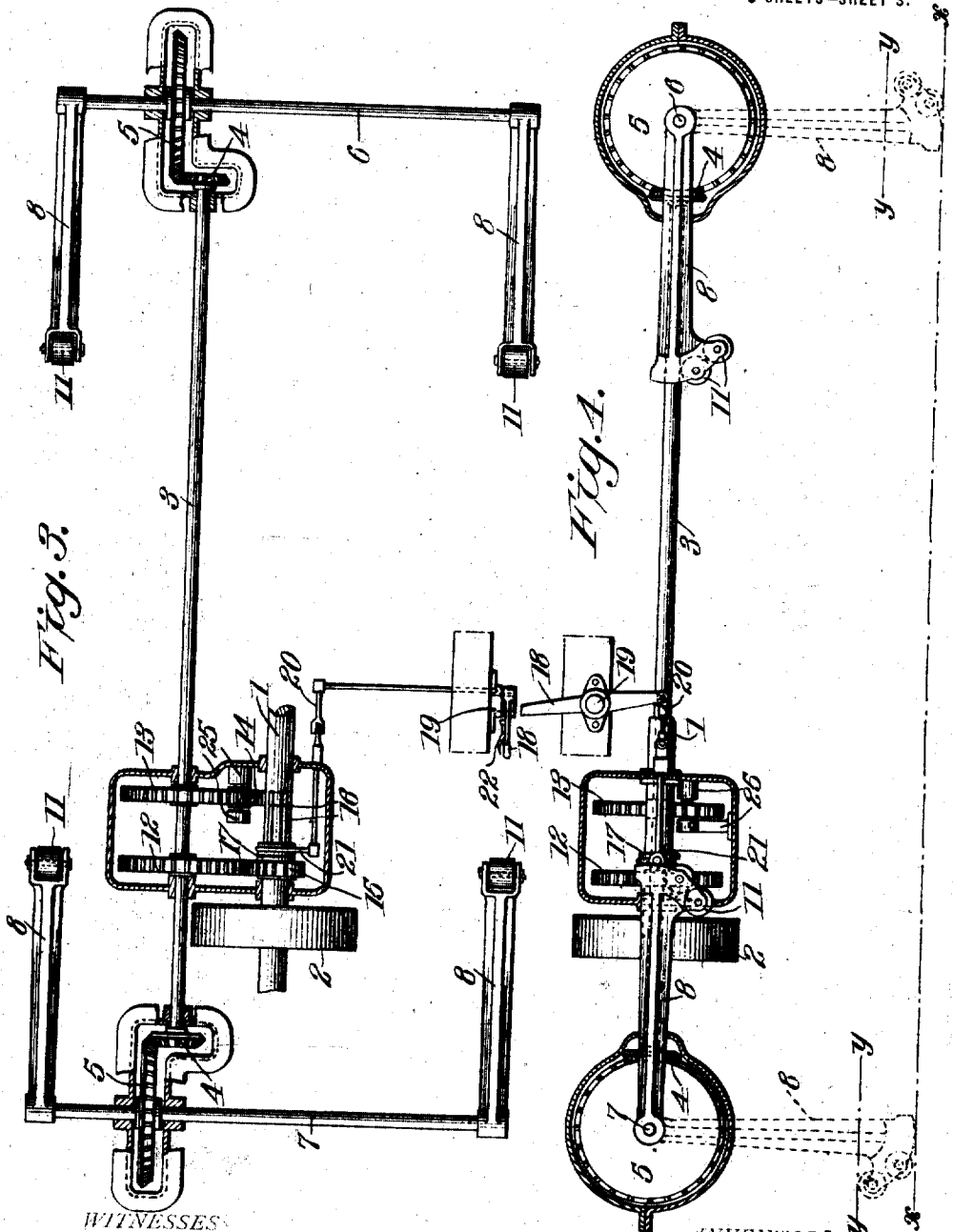

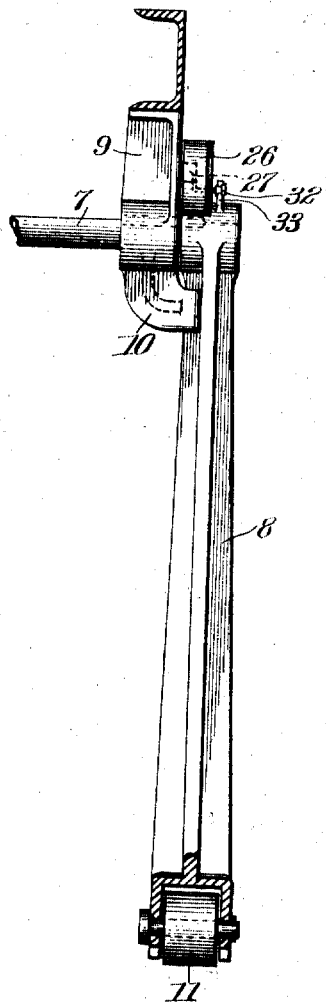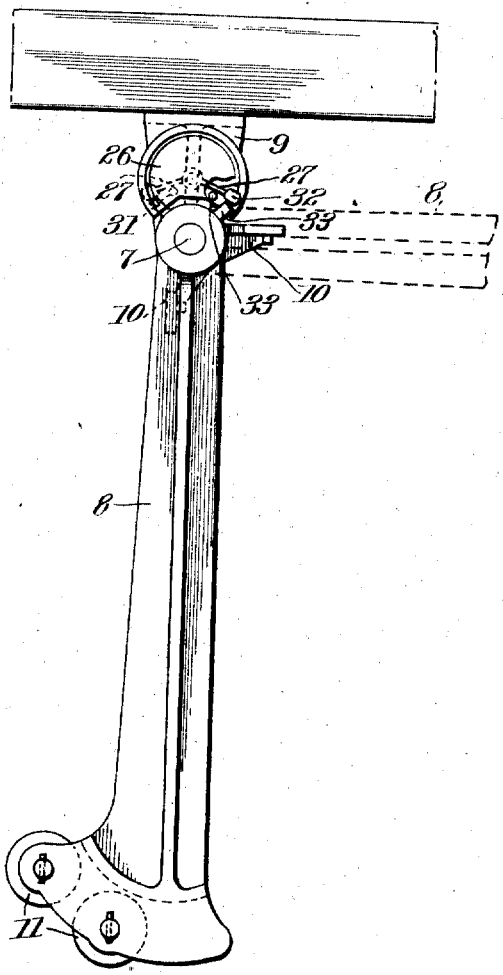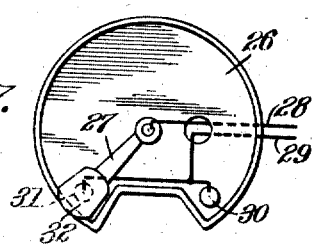

UNITED STATES PATENT OFFICE.

MELVILLE E. JONES, JR., AND JAMES L. JONES, OF WASHINGTON, DISTRICT OF COLUMBIA.

VEHICLE-LIFTING MECHANISM.

1,236,571.  Specification of Letters Patent.  Patented Aug. 14, 1917.

Application filed July 23, 1910. Serial No. 573,460.

*To all whom it may concern:*

Be it known that we, MELVILLE E. JONES, Jr., and JAMES L. JONES, both citizens of the United States, residing at Washington, in the District of Columbia, have invented certain new and useful Improvements in Vehicle-Lifting Mechanism, of which the following is a specification.

The wheels of an automobile are frequently jacked or raised above the ground while such vehicle is not running, in order to eliminate the contact of the tires carried thereon, with the ground. It is a well known fact that tires relieved of the weight of the vehicle, while it is not running, will greatly outlast tires which constantly sustain such weight, and it is to the preservation of the tires that the present invention is principally directed.

In garages the floors are often covered with oil which has dripped from the engine or its connected parts or which has been wasted while cleaning or oiling the vehicle. In such cases our invention may also be used to lift the vehicle out of contact with said oil, in order to avoid injury caused by oil on tires.

Our invention is attached to the vehicle and can be operated both on the road and in a garage, and it effectually relieves the tires of weight.

A very desirable feature of the invention is that the vehicle may be readily raised in order to render the same, or any part thereof, readily accessible for repair or inspection, as when necessary to repair or remove a tire and replace the same or to repair or adjust the mechanical troubles.

It will thus be seen that the invention is useful in all instances where it is desired to raise the machine or a wheel thereof.

Up to the present time, so far as we are aware, in elevating or lifting vehicles, devices independent of the same have been employed. This invention dispenses with the necessity of using such independent devices and also effectively performs the desired functions mentioned.

Another very desirable feature of our invention is that all wheels of the vehicle are raised or lowered simultaneously and the vehicle, therefore, is moved as a unit; thus dispensing with a separate operation for raising each wheel, as is incidental to the use of separate jacks which are generally employed.

In providing a device to accomplish these functions, among our objects are to provide a device attached to the vehicle; a device that is driven from the engine of the vehicle; to provide simultaneously operable legs or supports adjacent each wheel, to lift and sustain the weight of the vehicle, and movable in opposite directions in a path of ninety degrees of an arc; to provide gearing and shafting for said legs and means to throw the same in and out of driving relation with the main shaft of the engine; to provide means to raise or lower the supports consisting of a sliding gear and manually operable lever mechanism; and to provide means to automatically cut off the driving power when the machine has been raised and when the legs have returned to position beneath the chassis.

Other minor objects will appear from the description hereinafter following.

With these and other objects in view, our invention is embodied in one form of device which is hereinafter described and illustrated in the accompanying drawings.

In these drawings, Figure 1 is an inverted plan of an automobile showing the invention attached thereto; Fig. 2, a side elevation thereof; Fig. 3, a plan view of the mechanism comprising our invention and showing the same separate from the automobile; Fig. 4, a side elevation thereof; Figs. 5 and 6, detail front and side views of one of the lifting legs, showing means adjacent thereto and operated thereby for automatically cutting off the driving power; Fig. 7, a plan of the box for containing such mechanism, with the lid or cover removed; Fig. 8, a partial plan of a modified form; Fig. 9, a vertical section through the parts thereof, and Fig. 10, a side elevation of one of the lifting members thereof.

Referring to the drawings, 1 designates the main shaft of the engine of an automobile and 2 is the fly wheel on said shaft 1. These are not part of the invention. 3 is a longitudinal shaft running parallel to the main shaft 1 and at each end is provided with a bevel gear 4. The bevel gears 4 mesh with bevel gears 5 keyed to the respective transverse shafts 6 and 7 which are provided at each end with a lifting and supporting leg 8. These legs are termed hereinafter in some instances, revoluble lifting members, downwardly movable lifting members and vertically movable lifting members. The transverse shafts 6 and 7, by means of the gearing shown, revolve the legs 8 vertically simultaneously in opposite directions. When not in use the supporting legs are carried in a horizontal position, as shown in full lines in the drawings, and they are adapted to simultaneously travel downward from said position about ninety degrees of an arc, until they are substantially vertical as shown in dotted lines in Fig. 4.

In moving to the vertical position the legs 8 are driven or revolve downwardly against the ground causing the vehicle to be lifted a distance equal to the projection of the legs below the tires.

The scale of the drawing shows the vehicle adapted to be raised about five inches. The line $x$—$x$ represents the ground line and the lines $y$—$y$ drawn parallel to the ground represent a tangent to the periphery of the tires in the elevated position of the vehicle. The movement of the legs ceases when the vertical position is reached as the driving power is automatically cut off.

Members 9 are secured to the side beams of the chassis of the vehicle. These members provide suitable bearings for the transverse shafts and they have vertical and horizontal arms 10, the legs abutting against the vertical arms when the vertical position is reached and against the horizontal arms when the horizontal position is reached. These arms act as positive stops to limit the movement of the legs. The legs or lifting members are provided with rollers 11 at their base adapted for contact with the ground when lifting the vehicle and they serve to reduce friction. Gears 12 and 13 are keyed to the longitudinal shaft 3 and an intermediate or idler gear 14 meshes with the gear 13. Shaft 3 by means of the bevels 4 meshing with bevels 5, is adapted to drive the transverse shafts 6 and 7, causing the legs or supports 8 to accomplish the function set forth. The power for driving this mechanism is transmitted from the engine which propels the vehicle. On the main shaft 1 of the engine adjacent the fly wheel 2, is located a gear 15 adapted to slide on splines or feathers 16 in order that it may mesh with either gear 12 or 14. When the gear 15 meshes with gear 12 it causes the shaft 3 to turn in an opposite direction from that in which it turns when in mesh with idler 14 which meshes with gear 13. By one direction of rotation of the shaft, the legs 8 will be lowered, and by rotation in the opposite direction the legs will be raised. The determination of the specific set of gears that will raise the legs or lower them, depends upon the direction in which the main shaft 1 revolves. The sliding gear 15 has a shank portion 17 provided with a circumferential groove. 18 is an operating lever for the sliding gear and it is pivoted at 19 to one of the side beams of the chassis, and at its lowest extremity it is pivoted to a link 20 by means of a transverse rod, and the link 20 is pivoted at its other end to a bifurcated member 21, adapted to engage the groove of the sliding gear. The gear will slide on the shaft 1 when the lever is operated owing to the connection shown. The lever carries a spring-pressed plunger 22 adapted to enter the notches 23 in a sector plate 24 mounted on the vehicle. (Fig. 2). Three notches are provided and the desired set of gears for operating the legs may be locked together by the engagement of the plunger with the outer notches and when the sliding gear is placed in neutral position, the plunger is adapted to engage the central notch. The lever 18 is shown on the left side of the vehicle to prevent confusion with the levers for operating the vehicle, but it may be located elsewhere, if desired.

The various gear mechanisms are incased and the casings have been partly broken away on all views to more clearly illustrate the parts. The casings provide suitable bearings for the shafts. 25 are bearings for the intermediate gear 14 and these bearings are secured to the casing adjacent the gear.

When the vehicle has been lifted or elevated, the legs are in vertical position and on reaching such position the power from the engine is automatically cut off; and also when the machine is lowered and the legs have returned to horizontal position, the power from the engine will be automatically cut off. This automatic cut off mechanism will now be described and it is particularly shown in Figs. 5, 6 and 7.

A box or casing 26 is secured to one of the members 9 and forms a protective covering for an electric switch. This switch is connected so as to interrupt the armature circuit of the ignition system for the engine. 27 is a switch arm, and one of the armature wires 28 of the ignition system is connected thereto, and the other wire 29 is connected to two contact buttons 30 and 31, (Fig. 7), the circuit being made continuous by the current passing through the wire 28, switch arm 27 and to either button 30 or 31, and then through the wire 29. The remainder of the ignition system is not changed. The switch arm 27 extends through an arcuate slot in the box 26 and has an exterior knob 32. This knob is arranged in the path of a lug 33 carried by the adjacent leg or support 8, and it is so arranged that when the legs are in a horizontal position and it is desired to lift the vehicle, the switch arm 27 is placed on contact button 30, and the engine is started in the usual manner, without the clutches for driving the machine being in engagement with the main driving shaft. When the vertical position is reached, the lug 33 will bear against the knob 32 and force the same off contact button 30, thereby automatically interrupting the ignition circuit and stopping the engine, due to the failure of a spark to ignite the carbureted mixture in the engine cylinders.

In order to return the supports to horizontal position, the switch arm 27 is placed on contact button 31, the method of procedure as outlined above for lowering the legs being followed.

In case the momentum of the engine tends to turn the mechanism after the switch arm 27 is forced off button 30 or 31, the arms 10 positively stop further movement of the legs.

The lifting mechanism described is adapted to be operated when the vehicle is not running, and while the engine is turning over. To raise the vehicle, the lever 18 is operated to move the sliding gear in driving relation with the gears of shaft 3 whereupon the legs will be driven to vertical position and by means of the mechanism previously described the movement of such legs or supports will be automatically stopped. In order to return the legs to horizontal position, it is necessary to adjust the sliding gear and then adjust the switch arm 27 as previously described. When the horizontal position is reached, the movement of the legs is automatically stopped as described. The sliding gear is then moved to the neutral position, and the mechanism for the engine is thus placed in running order after placing switch arm 27 on contact button 30 or 31.

It is clear that the engine cannot be operated after a return of the legs to horizontal position until the switch arm has been moved on one of the contact buttons.

In Figs. 8, 9 and 10, there is shown a modified form. Attached to the vehicle adjacent the wheels are combined bearings and casings 34, in which lifting members 35 are spirally raised or lowered. These members are screw threaded and pass through bevel gears 36 which are interiorly threaded at the center to suit members 35. The bevels 38 are keyed to shaft 37 and mesh with the bevel 36 which are provided with shanks seated and adapted to turn on ball bearings in suitable recesses in the combined bearings and casings. The transverse shafts are driven by a longitudinal shaft and bevel gear connection as in the other form, and are operated by the same form of lever and connected operating parts. The motion imparted to the bevels 36 will cause the same to raise or lower the members 35, according to the direction of rotation of the engine, by means of the threaded connection between the members and bevels. At the base of the members 35 are removable shoes 39 in which the members revolve on ball bearings when the shoes are in contact with the ground and the mechanism is operating.

A switch mechanism for automatically stopping the engine by interrupting the armature circuit of the ignition system is similar in construction and operation as that used for the other form except in the following particulars. The switch arm 40 extends through the side beam of the chassis and has an arm 41 attached thereto which is adapted to move with said switch arm. A vertically movable rod 42 is secured adjacent the switch and has projections 43 and 44 in the path of the arm 41 and a projection 45 adapted to be depressed by the head 46 of the members 35. Contact buttons 46 and 47 are connected to the armature circuit in a manner similar to the buttons 30 and 31 of the other form. When the switch arm is in contact with the button 46 and the legs are returning to raised position shoe 39 strikes a projection 49 of the rod and moves the switch arm 40, by means of arm 41 and projection 43, out of contact with the button 46 and automatically cuts off the driving power. In lowering the members, the switch arm 40 is in contact with button 47 which location is slightly under and in the path of projection 44. When the members are lowered the head 46 will strike the projection 45, which by means of projection 44 and arm 41 will move the switch arm downwardly off the button 47, automatically interrupting the armature circuit of the ignition system. 50 is a spring to return the rod 42 to position preparatory to another movement of the members 35. One of the combined casings and bearings at the front and rear of the vehicle is shaped to house the bevel gears for driving the transverse shafts. The heads 46 and shoes 39 act as positive stops should the switch for any reason fail to operate.

The structures illustrated are shown by way of example; hence we do not limit ourselves thereto. Any changes in the mechanism may be made within the spirit and scope of the invention.

Having thus described our invention, what we claim is:—

1. In combination with a vehicle, revoluble lifting members separately attached to the vehicle, and power means to simultaneously revolve said members in opposite directions to lift the vehicle.

2. In combination with a vehicle and wheels thereon having tires, lifting members adjacent the front and rear of the vehicle, and power means to simultaneously operate said front and rear lifting members, respectively, in opposite directions to lift the vehicle as a unit to relieve the tires of the weight of the vehicle.

3. In combination with a vehicle having wheels provided with tires, positively driven lifting means attached to the vehicle and means on the vehicle separate from the driving means to limit the movement of the lifting means, said lifting means serving to elevate the vehicle and wheels as a unit to relieve the tires of the weight of the vehicle.

4. In combination with a vehicle having wheels provided with tires, revolubly driven lifting means to lift the vehicle as a unit to relieve the tires of the weight of the vehicle, and means beneath and connected to the vehicle separate from the lifting means to limit the movement of said lifting means.

5. In combination with a vehicle, means beneath and connected to the vehicle adapted to lift the vehicle and maintain it out of contact with the ground, and means to automatically cut off the lifting movement thereof when the vehicle has been elevated, substantially as described.

6. In combination with a vehicle, means beneath and connected to the vehicle adapted to lift the vehicle and maintain it out of contact with the ground, and means to automatically cut off the movement thereof, when said means move to retracted position, substantially as described.

7. In combination with a vehicle, means beneath and connected to the vehicle adapted to lift the vehicle and maintain it out of contact with the ground, means to automatically cut off the lifting movement thereof when said means has been operated and the vehicle elevated, and means to automatically cut off the movement thereof when said means move to retracted position, substantially as described.

8. In combination with a vehicle and its wheels, a plurality of lifting members beneath and connected to the vehicle and adapted to lift the vehicle and wheels out of contact with the ground as a unit, and electrical means to cut off the movement thereof, substantially as described.

9. In combination with a vehicle and its wheels and armature circuit, a plurality of lifting members beneath and connected to the vehicle and adapted to lift the vehicle and wheels out of contact with the ground as a unit, and an electric switch mechanism to control the movement of said means, substantially as described.

10. In combination with a vehicle and engine thereon and an electric circuit, a plurality of lifting members movable independently of the vehicle and adapted to be driven by the engine to lift the vehicle as a whole, an electric switch mechanism in said circuit to cut off the motion of the engine, contact portions, a switch arm adapted to close the circuit by contact with said portions to operate said members, substantially as described.

11. In combination with a vehicle and engine thereon and an electric circuit, lifting members adapted to be driven by the engine, an electric switch mechanism in said circuit to cut off the motion of the engine, contact portions, a switch arm adapted to close the circuit by contact with said portions to operate said members, and means carried by one of the lifting members arranged in the path of the switch arm to disengage the arm and contact portions to break the circuit, whereby the operation of the members will cease, substantially as described.

12. In combination with a vehicle provided with wheels having tires thereon and an engine on the vehicle, a first shaft driven from the engine, second shafts, one of the second shafts being located adjacent each end of the first shaft and being driven by the first shaft, and lifting members, one lifting member being driven by each of the second shafts to lift the vehicle as a unit to elevate the tires to relieve them of the weight of the machine.

13. In combination with a vehicle and wheels thereof having tires and an engine on the vehicle, revoluble shaft means, gear means between the engine and shaft means, legs fixed on the shaft means to revolve therewith to lift the vehicle as a unit to elevate and relieve the tires of the weight of the vehicle, and means to limit the revolving movement of the legs.

14. In combination with a vehicle and engine thereon, revoluble shaft means, gear means between the engine and shaft means, legs fixed on the shaft means to revolve therewith to lift the vehicle above the ground, bearings for the shaft and stop arms on said bearings to limit the movement of the legs, substantially as described.

15. In combination with a vehicle and engine, gear and shaft means, legs driven by said means to lift the vehicle as a unit, bearings for said means, stop arms to limit the movement of the legs, and an electric switch means in circuit with the engine to cut off the operation of the legs, substantially as described.

16. In combination with a vehicle and engine, gear and shaft means, legs driven by said means, bearings, stop arms on said bearings to limit the movement of the legs, an electric switch means in circuit with the engine to cut off the operation of the legs, and means to operate the switch through the movement of the legs, substantially as described.

17. In combination with a vehicle having wheels provided with tires and an engine, shaft and gear mechanism, vertically movable lifting means driven by said mechanism to lift the wheels to relieve the tires of the weight of the vehicle, a gear connection between the engine and said mechanism, and means to prevent accidental return of the lifting members to the ground.

18. In combination with a vehicle having wheels provided with tires and having an engine, vertically movable members driven by the engine to lift the wheels to relieve the tires of the weight of the machine, shaft and gear mechanism, and a sliding gear connection between said members and engine, adapted to be connected to the shaft and gear mechanism, and means to prevent accidental return of the lifting members to the ground.

In testimony whereof we have affixed our signatures in presence of two witnesses.

MELVILLE E. JONES, Jr.
JAMES L. JONES.

Witnesses:
WALTER O. BLACKWOOD,
JOS. H. BLACKWOOD.